US010991273B2

United States Patent
Walley, Jr.

(10) Patent No.: US 10,991,273 B2
(45) Date of Patent: Apr. 27, 2021

(54) COLOR CODING SYSTEM FOR PVC PIPES AND COUPLINGS

(71) Applicant: James W. Walley, Jr., Weatherford, TX (US)

(72) Inventor: James W. Walley, Jr., Weatherford, TX (US)

(*) Notice: Subject to any disclaimer, the term of this patent is extended or adjusted under 35 U.S.C. 154(b) by 0 days.

(21) Appl. No.: 16/102,382

(22) Filed: Aug. 13, 2018

(65) Prior Publication Data

US 2018/0350273 A1 Dec. 6, 2018

Related U.S. Application Data

(63) Continuation of application No. 15/279,016, filed on Sep. 28, 2016, now Pat. No. 10,078,974, which is a continuation-in-part of application No. 14/266,948, filed on May 1, 2014, now abandoned.

(51) Int. Cl.
| | | |
|---|---|---|
| *G09F 3/02* | (2006.01) | |
| *G09F 3/00* | (2006.01) | |
| *F16L 55/00* | (2006.01) | |
| *E03C 1/00* | (2006.01) | |

(52) U.S. Cl.
CPC .............. *G09F 3/0295* (2013.01); *E03C 1/00* (2013.01); *F16L 55/00* (2013.01); *F16L 2201/10* (2013.01); *F16L 2201/60* (2013.01); *G09F 2003/0208* (2013.01)

(58) Field of Classification Search
CPC .. E21B 17/006; G09F 3/0295; F16L 2201/10; F16L 2201/60; F16L 35/00
See application file for complete search history.

(56) References Cited

U.S. PATENT DOCUMENTS

| | | | |
|---|---|---|---|
| 3,170,667 A | 2/1965 | Szohatzky | |
| 3,418,739 A | 12/1968 | Buczak | |
| 4,696,326 A | 9/1987 | Sturgis | |
| 5,280,967 A | 1/1994 | Varrin, Jr. | |
| 5,653,264 A * | 8/1997 | Atkinson | F15D 1/02 138/103 |
| 5,773,111 A | 6/1998 | Brewster | |
| 6,082,627 A | 7/2000 | Raterman | |
| 6,311,637 B1 | 11/2001 | Moss | |
| 8,430,431 B2 | 4/2013 | Schindel | |
| 2001/0040374 A1 | 11/2001 | Breihan | |
| 2008/0164338 A1 | 7/2008 | Burns | |
| 2008/0174107 A1* | 7/2008 | Jordan | G09F 3/00 285/18 |
| 2011/0175343 A1* | 7/2011 | Akins | G09F 3/00 283/74 |
| 2011/0258896 A1* | 10/2011 | Watson | B29C 45/14836 40/664 |
| 2012/0211974 A1 | 8/2012 | Richardson | |

(Continued)

*Primary Examiner* — Gary C Hoge
(74) *Attorney, Agent, or Firm* — James E. Walton

(57) ABSTRACT

A system of visual and non-visual marks for PVC pipes and couplings which allows users to group PVC pipes and couplings by type, size, and composition with a series of colors, shapes, swirls, patterns. The series of colors, shapes, swirls, patterns are applied to the PVC pipes and couplings by etching, painting, applying stickers, and or molding into the PVC itself. The non-visual mark utilize the magnetic and radio reflective nature of the marks to allow remote identification of the plumbing pipes and couplings after being buried.

20 Claims, 10 Drawing Sheets

(56) References Cited

U.S. PATENT DOCUMENTS

2014/0000138 A1    1/2014  Cable
2014/0326507 A1*  11/2014  Spriggs ................. E21B 17/006
                                                            175/40
2017/0306705 A1*  10/2017  Drevdal ........... G06K 19/07758

* cited by examiner

COLOR CODING SYSTEM FOR PVC PIPES AND COUPLINGS

BACKGROUND

1. Field of the Invention

The present invention relates in general to the field of poly-vinyl chloride "PVC" pipes and couplings and the ability of users to quickly determine the type of PVC pipes and PVC couplings from a glance without using tools to measure the diameters of the PVC pipes and PVC couplings.

2. Description of Related Art

Pipes and couplings for pipes are typically not marked in a way that plumbers and users can readily glance at the fittings and the pipes to determine the size, composition, and configuration of the fittings and pipes used. Some pipes are color coded as to their composition or schedule. Some example include: coppered colored copper pipe; grey schedule 80 PVC; black acylonitrile-butadiene-styrene "ABS" pipe; and light blue polybutylene "PB" pipes. While having pipes color coded as to composition helps users determine the composition, there is no easy way for users of pipes to quickly and easily select proper fittings from merely looking at the pipes and fittings.

When a user is ready to assembly a pipe to a fitting they select the pipe based upon the requirements of the installation and then select the fittings to attach the pipe as needed. To insure that the selected fittings are the proper fittings and matched to the selected pipe, the fittings must be measured and compared to the measurements of the pipe. Alternatively, the user test fits the fittings on the pipes to check the fit. If the needed fitting is in a bin with other non-needed fittings then the user must repeated measure or check to find the right fitting in the bin of fittings, thereby wasting time. Currently some manufacturers color the packaging the plumbing fixtures are shipped in based on size. However, color coding packing does not help the user when the plumbing fixture is removed from the package.

Referring to FIG. 1 in the drawings, a prior art embodiment of a PVC pipe and PVC coupling according to the present application is illustrated. Plumbing system 101 is a depiction of a typical installation of PVC pipes and PVC fittings. Plumbing system 101 includes a first pipe 111, a second pipe 115, a third pipe 121, a forth pipe 125, and a fifth pipe 131. Connecting first pipe 111 to second pipe 115 is a reducing tee 135 coupled to fifth pipe 131. Connecting second pipe 115 to third pipe 121 is an elbow 141. Connecting third pipe 121 to forth pipe 125 is a reducer 145. A plumber cannot visually look at system 101 and verify that the proper sized fittings were used. This forces the plumber to measure each fitting to check compliance. Furthermore, an inspector trying to validate the work the plumber's completed cannot readily check the size of the fittings because they are glued together. The inspector could measure the outside of the fittings and compare the outer diameter to the expected outer diameter, however that method is labor intensive and potentially unreliable due to the variance in fitting construction. While there are many ways to mark plumbing fixtures well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
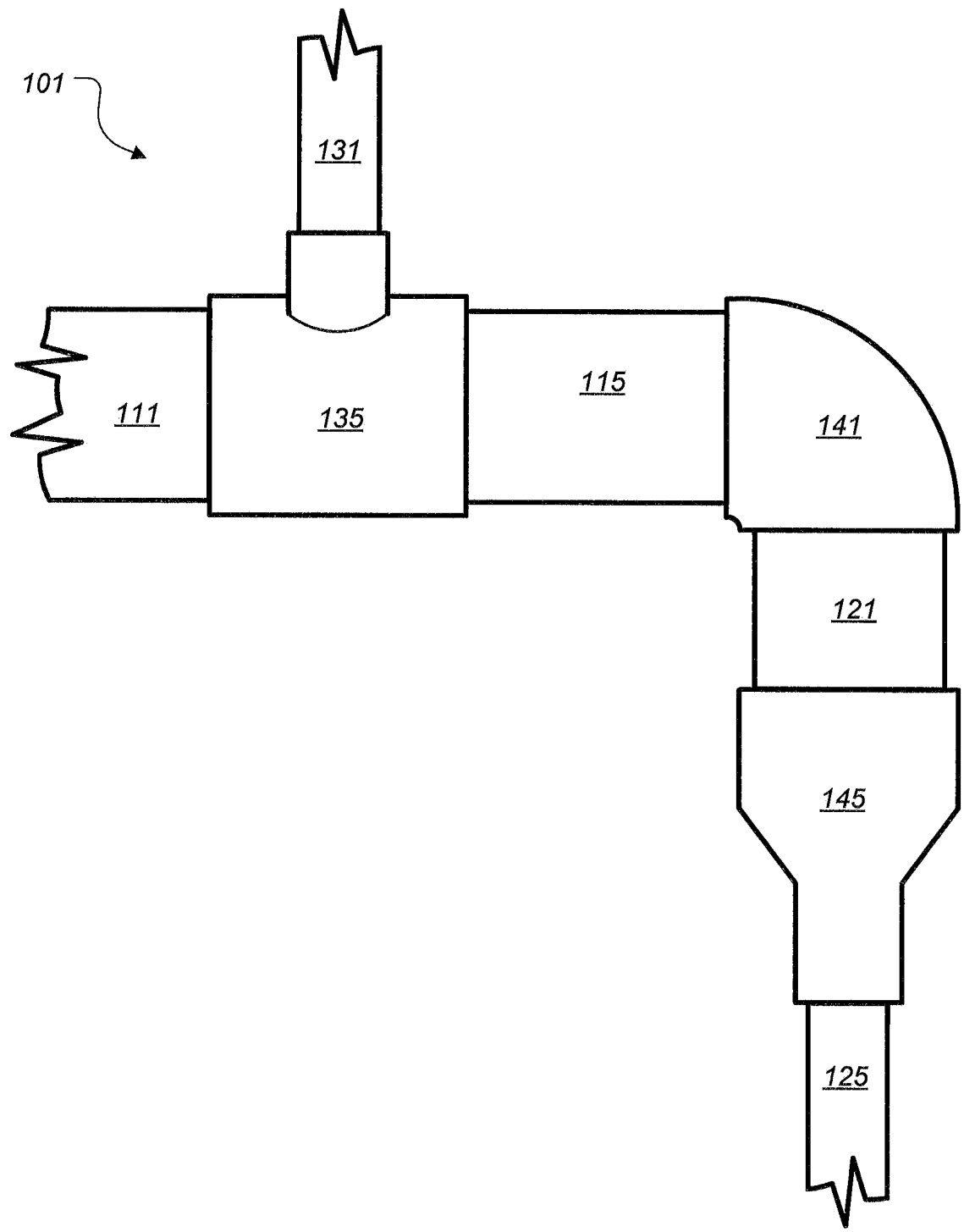
FIG. 1 is a plan view of PVC pipes and couplings according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of color coding PVC pipes and couplings are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A color coding system for PVC pipes and couplings which allows users to group plumbing articles by type, size, and composition with a series of colors, shapes, swirls, patterns. The series of colors, shapes, swirls, patterns are applied to the plumbing articles by etching, painting, applying stickers, molding, anodizing, plating, texturing, and or embedding materials into the plumbing articles themselves.

Preferably the series of colors, shapes, swirls, and patterns are incorporated into the plumbing articles such that they are irreplaceable and non-removable. Non-removable marks prevent the marking system from being changed from one installation to another. Non-removable marks may be sealed with a layer of clear-coat, a transparent layer of plastic, or other elements to increase non-removability of the mark. Therefore, users in a decade can rely on the certain pattern being a certain way and not changed by the installer. Plumbing articles as contemplated by this application include but are not limited to; pipes; fittings; couplings; reducers; tees; elbows; tubing; and adapters. Preferably the plumbing articles are fabricated from PVC, however alternative embodiments are fabricated from rubber, copper, plastic, aluminum, or steel.

Pipes are fabricated in various sizes such as: ⅛"; ¼"; ⅜'; ½"; ¾"; 1"; 1¼"; 1½"; 2"; 2½"; 3" . . . . Fittings or couplings are fabricated in various sizes to properly couple together pipes. The size of the couplings are determined by the size of the pipes to be coupled. This application contemplates selecting a color for each size of pipe. For example 1" pipe would be assigned a blue color and a 1¼" pipe would be assigned a green color. Fittings suitable for 1" pipe would also be assigned the same blue color and fittings for 1¼" pipes assigned the same green color. Coloring the fittings to the pipes helps users select and check the proper fittings to the pipes are used.

Figure 2:
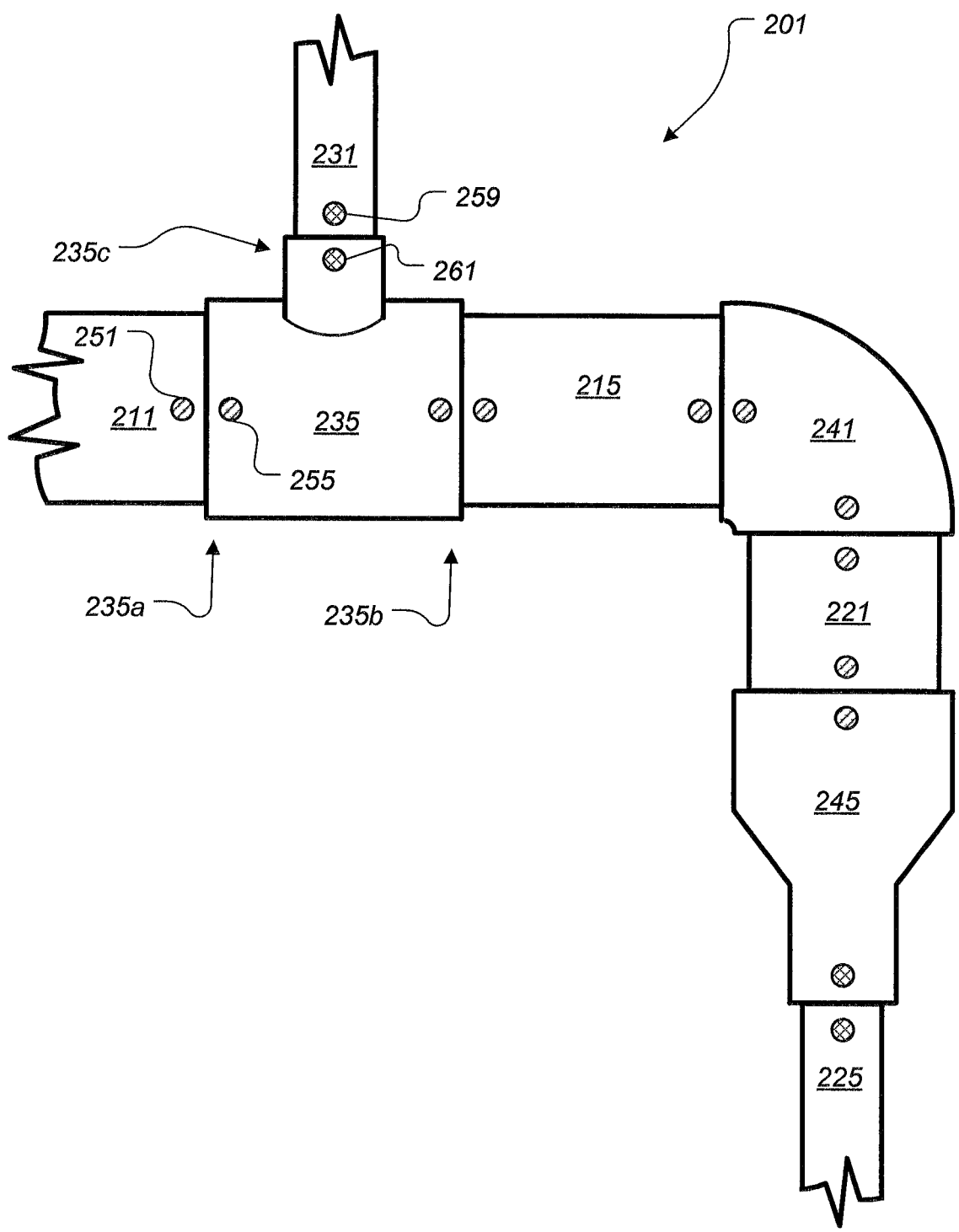
FIG. 2 is a plan view of an embodiment of a color coding system for PVC pipes and couplings according to the present application.

Referring now also to FIG. 2 in the drawings, an embodiment of a color coding system for PVC pipes and couplings according to the present application is illustrated. Plumbing system 201 is a depiction of an improved installation of PVC pipes and PVC fittings. Plumbing system 201 includes a first pipe 211, a second pipe 215, a third pipe 221, a forth pipe 225, and a fifth pipe 231. Connecting first pipe 211 to second pipe 215 is a reducing tee 235 also coupled to fifth pipe 231. Reducing tee 235 has three ports: first port 235a, second port 235b, and third port 235c. First port 235a and 235b have the same diameter, while port 235c has a reduced diameter compared to 235a or 235b. Connecting second pipe 215 to third pipe 221 is an elbow 241. Connecting third pipe 221 to forth pipe 225 is a reducer 245. A plumber or user can visually look at system 201 and verify that the proper sized fittings were used. What allows a user to visually look at system 201 and be able to verify the proper sized fittings in relation to pipes were used are the color codes on the pipes and fittings.

First mark 251 is located a set distance from the end of the first pipe 211 such that the first mark 251 remains visible while coupled to the adjacent reducing tee 235. Second mark 255 is located a set distance away from the end of reducing tee 235. Because first pipe 211 and the reducing tee 235 are properly sized to couple together first mark 251 is identical in color to second mark 255. The applicant used similar hatching in first mark 251 and second mark 255 to indicate that the color is the same. The hatching does not indicate a difference in materials just a change in color.

Third mark 259 is located a set distance from the end of the fifth pipe 231 such that the third mark 259 remains visible while coupled to the adjacent reducing tee 235. Forth mark 261 is located a set distance away from the end of reducing tee 235. Because fifth pipe 231 and the reducing tee 235 are properly sized to couple together third mark 259 is identical in color to forth mark 261. The applicant used similar hatching in third mark 259 and forth mark 261 to indicate that the color is the same. The hatching does not indicate a difference in materials just a change in color. It should be apparent that the color of first mark 251 is different than forth mark 261 to indicate the difference in diameter between the coupling and the pipe.

Figure 3:
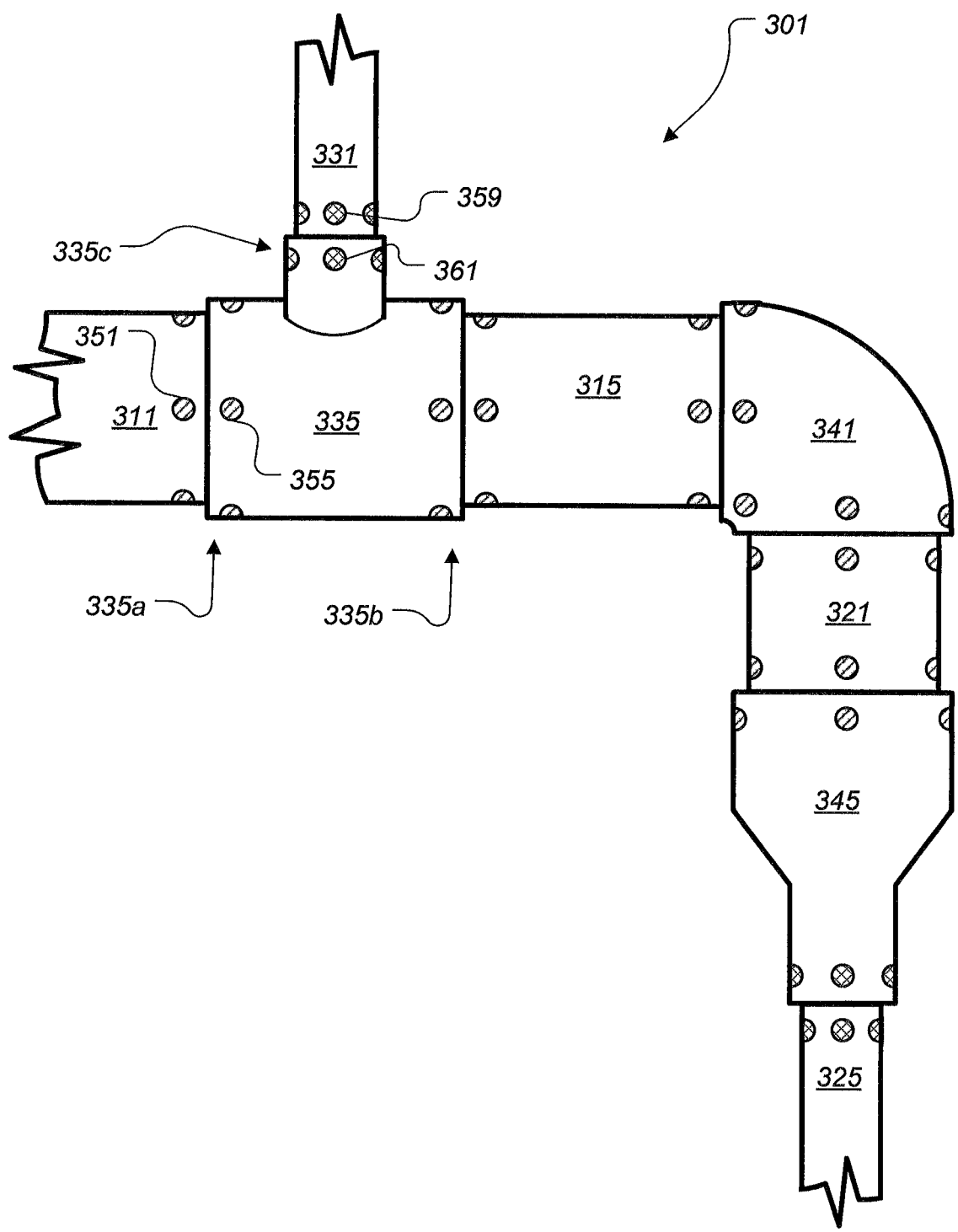
FIG. 3 is a plan view of an embodiment of a color coding system for PVC pipes and couplings according to the present application.

Referring now also to FIG. 3 in the drawings, an embodiment of a color coding system for PVC pipes and couplings according to the present application is illustrated. Plumbing system 301 is a depiction of an improved installation of PVC pipes and PVC fittings. Plumbing system 301 includes a first pipe 311, a second pipe 315, a third pipe 321, a forth pipe 325, and a fifth pipe 331. Connecting first pipe 311 to second pipe 315 is a reducing tee 335 also coupled to fifth pipe 331. Reducing tee 335 has three ports: first port 335a, second port 335b, and third port 335c. First port 335a and 335b have the same diameter, while port 335c has a reduced diameter compared to 335a or 335b. Connecting second pipe 315 to third pipe 321 is an elbow 341. Connecting third pipe 321 to forth pipe 325 is a reducer 345. A plumber or user can visually look at system 301 and verify that the proper sized fittings were used. What allows a user to visually look at system 301 and be able to verify the proper sized fittings in relation to pipes were used are the color codes on the pipes and fittings.

First mark 351 is located a set distance from the end of the first pipe 311 such that the first mark 351 remains visible while coupled to the adjacent reducing tee 335. Second mark 355 is located a set distance away from the end of reducing tee 335. Because first pipe 311 and the reducing tee 335 are properly sized to couple together first mark 351 is identical in color to second mark 355. The applicant used similar hatching in first mark 351 and second mark 355 to indicate that the color is the same. The hatching does not indicate a difference in materials just a change in color.

Third mark 359 is located a set distance from the end of the fifth pipe 331 such that the third mark 359 remains visible while coupled to the adjacent reducing tee 335. Forth mark 361 is located a set distance away from the end of reducing tee 335. Because fifth pipe 331 and the reducing tee 335 are properly sized to couple together third mark 359 is identical in color to forth mark 361. The applicant used similar hatching in third mark 359 and forth mark 361 to indicate that the color is the same. The hatching does not indicate a difference in materials just a change in color. It should be apparent that the color of first mark 351 is different than forth mark 361 to indicate the difference in diameter between the coupling and the pipe. It should be apparent that the difference between system 201 and system 301 is that system 301 includes a plurality of mark arrayed around the diameter of the pipes and fittings. Arraying the marks facilitates easy recognition of the pipes and fittings without regards to the relative position of the marks to the user.

Figure 4:
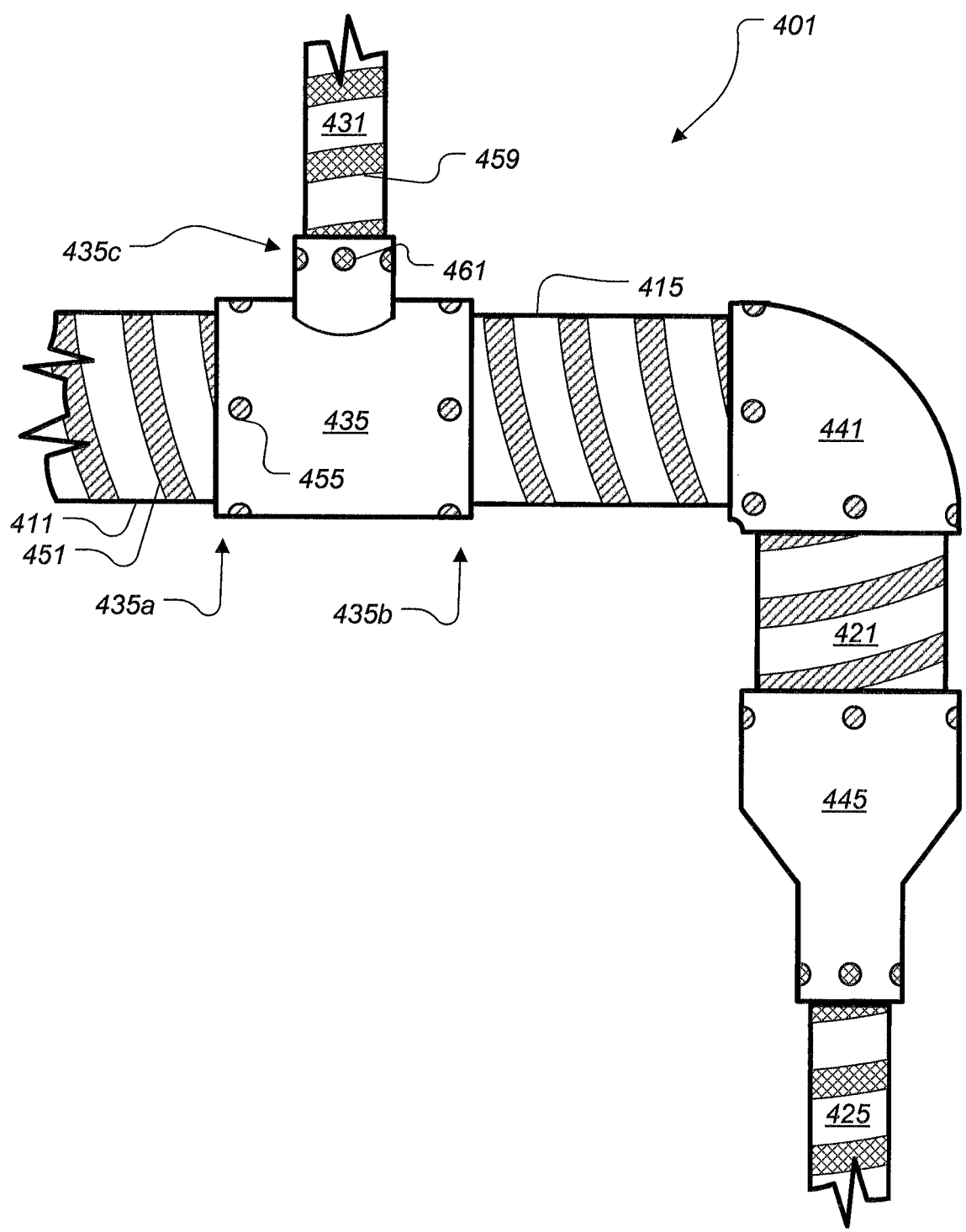
FIG. 4 is a plan view of a preferred embodiment of a color coding system for PVC pipes and couplings according to the present application.

Referring now also to FIG. 4 in the drawings, a preferred embodiment of a color coding system for PVC pipes and couplings according to the present application is illustrated. Plumbing system 401 is a depiction of an improved installation of PVC pipes and PVC fittings. Plumbing system 401 includes a first pipe 411, a second pipe 415, a third pipe 421, a forth pipe 425, and a fifth pipe 431. Connecting first pipe 411 to second pipe 415 is a reducing tee 435 also coupled to fifth pipe 431. Reducing tee 435 has three ports: first port 435a, second port 435b, and third port 435c. First port 435a and 435b have the same diameter, while port 435c has a reduced diameter compared to 435a or 435b. Connecting second pipe 415 to third pipe 421 is an elbow 441. Connecting third pipe 421 to forth pipe 425 is a reducer 445. A plumber or user can visually look at system 401 and verify that the proper sized fittings were used. What allows a user to visually look at system 401 and be able to verify the proper sized fittings in relation to pipes were used are the color codes on the pipes and fittings.

First mark 451 is located on the first pipe 411 such that the first mark 451 remains visible while coupled to the adjacent reducing tee 435 and is candy striped in a curved or helical pattern down the length of the pipe. Second mark 455 is located a set distance away from the end of reducing tee 435. Because first pipe 411 and the reducing tee 435 are properly sized to couple together first mark 451 is identical in color to second mark 455. The applicant used similar hatching in first mark 451 and second mark 455 to indicate that the color is the same. The hatching does not indicate a difference in materials just a change in color.

Third mark 459 is located on the fifth pipe 431 such that the third mark 459 remains visible while coupled to the adjacent reducing tee 435 and is candy striped in a curved or helical pattern down the length of the pipe. Forth mark 461 is located a set distance away from the end of reducing tee 435. Because fifth pipe 431 and the reducing tee 435 are properly sized to couple together, third mark 459 is identical in color to forth mark 461. The applicant used similar hatching in third mark 459 and forth mark 461 to indicate that the color is the same. The hatching does not indicate a difference in materials just a change in color. It should be apparent that the color of first mark 451 is different than forth mark 461 to indicate the difference in diameter between the coupling and the pipe. It should be apparent that the difference between system 201 and system 401 is that system 401 includes a plurality of marks arrayed around the diameter of the fittings and the spiral stripe down the length of the pipes. Arraying the marks and striping the pipes facilitates easy recognition of the fittings and pipes without regards to the relative position of the marks to the user.

Figure 5:
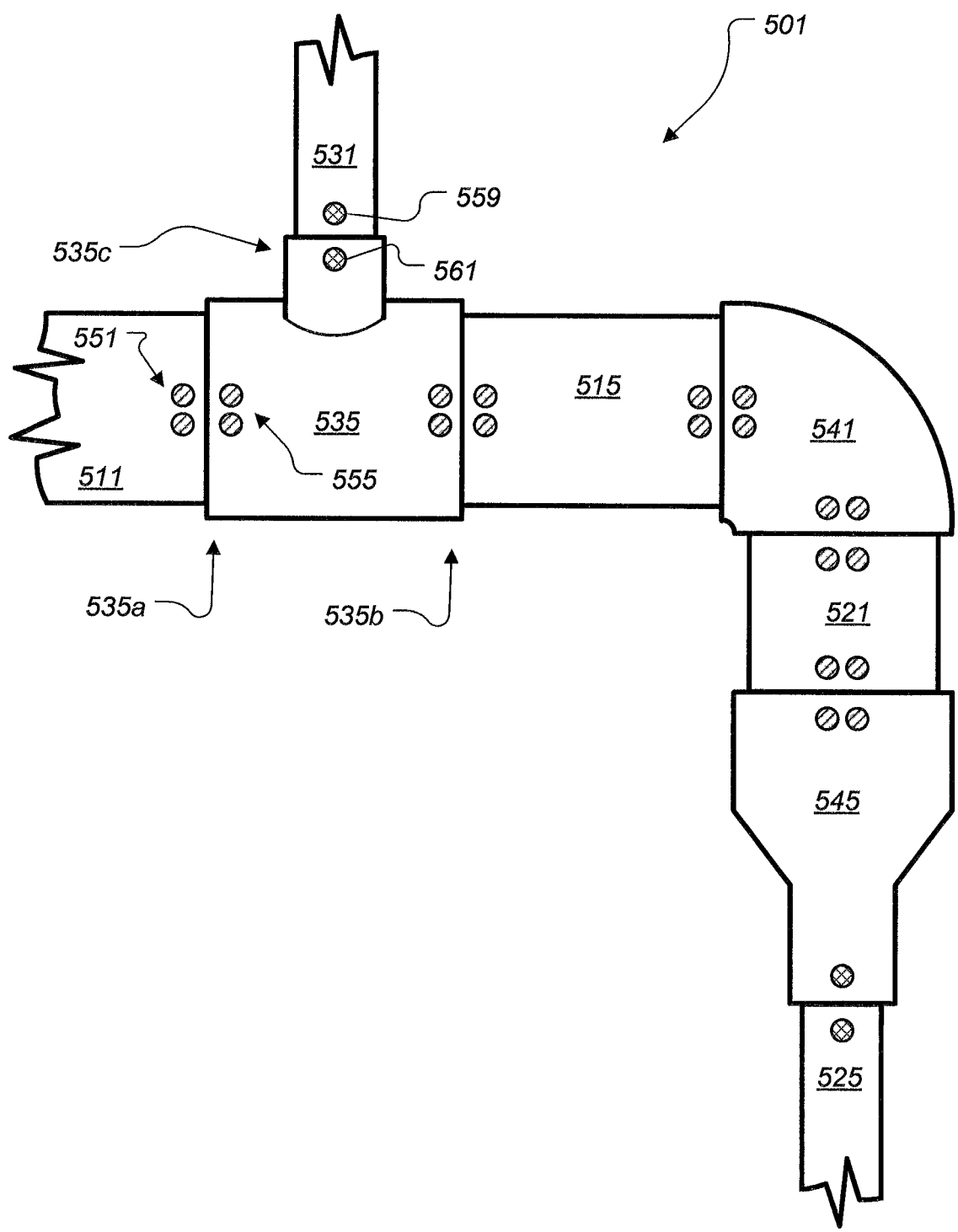
FIG. 5 is a plan view of an embodiment of a color coding system for PVC pipes and couplings according to the present application.

Referring now also to FIG. 5 in the drawings, an embodiment of a color coding system for PVC pipes and couplings according to the present application is illustrated. Plumbing system 501 is a depiction of an improved installation of PVC pipes and PVC fittings. Plumbing system 501 includes a first pipe 511, a second pipe 515, a third pipe 521, a forth pipe 525, and a fifth pipe 531. Connecting first pipe 511 to second pipe 515 is a reducing tee 535 also coupled to fifth pipe 531. Reducing tee 535 has three ports: first port 535a, second port 535b, and third port 535c. First port 535a and 535b have the same diameter, while port 535c has a reduced diameter compared to 535a or 535b. Connecting second pipe 515 to third pipe 521 is an elbow 541. Connecting third pipe 521 to forth pipe 525 is a reducer 545. A plumber or user can visually look at system 501 and verify that the proper sized fittings were used. What allows a user to visually look at system 501 and be able to verify the proper sized fittings in relation to pipes were used are the color codes on the pipes and fittings.

First mark 551, a pattern of two closely spaced shapes, is located a set distance from the end of the first pipe 511 such that the first mark 551 remains visible while coupled to the adjacent reducing tee 535. Second mark 555, a pattern of two closely shaped shapes, is located a set distance away from the end of reducing tee 535. Because first pipe 511 and the reducing tee 535 are properly sized to couple together first mark 551 is identical in color and pattern to second mark 555. The applicant used similar hatching in first mark 551 and second mark 555 to indicate that the color is the same. The hatching does not indicate a difference in materials just a change in color.

Third mark 559 is located a set distance from the end of the fifth pipe 531 such that the third mark 559 remains visible while coupled to the adjacent reducing tee 535. Forth mark 561 is located a set distance away from the end of reducing tee 535. Because fifth pipe 531 and the reducing tee 535 are properly sized to couple together third mark 559 is identical in color to forth mark 561. The applicant used similar hatching in third mark 559 and forth mark 561 to indicate that the color is the same. The hatching does not indicate a difference in materials just a change in color. It should be apparent that the color and pattern of first mark 551 is different than forth mark 561 to indicate the difference in diameter between the coupling and the pipe. It should be apparent that the difference between system 201 and system 501 is that system 501 includes the addition of patterns to aid is designating differences in PVC in addition to using different colors.

Figure 6:
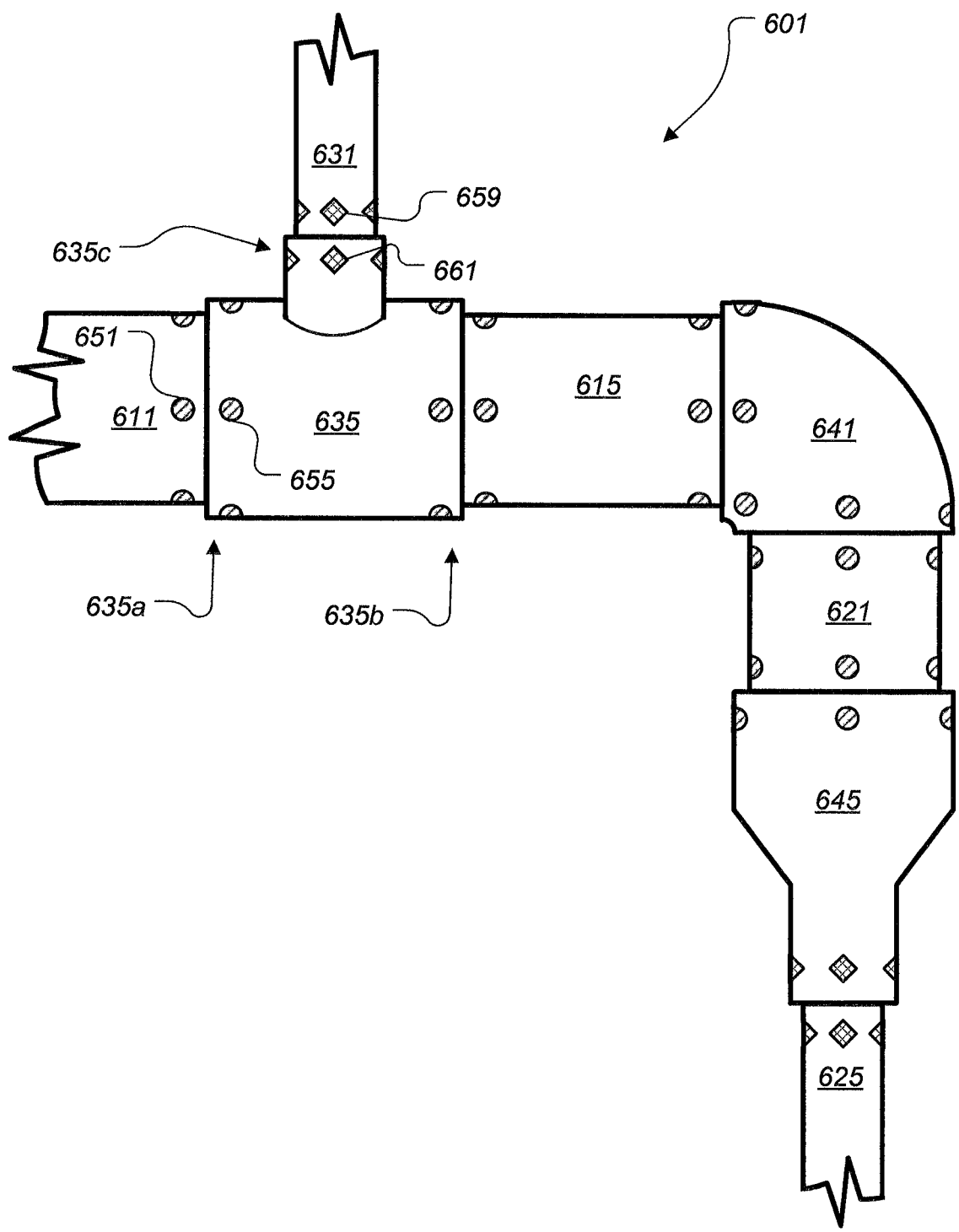
FIG. 6 is a plan view of an embodiment of a color coding system for PVC pipes and couplings according to the present application.

Referring now also to FIG. 6 in the drawings, an embodiment of a color coding system for PVC pipes and couplings according to the present application is illustrated. Plumbing system 601 is a depiction of an improved installation of PVC pipes and PVC fittings. Plumbing system 601 includes a first pipe 611, a second pipe 615, a third pipe 621, a forth pipe 625, and a fifth pipe 631. Connecting first pipe 611 to second pipe 615 is a reducing tee 635 also coupled to fifth pipe 631. Reducing tee 635 has three ports: first port 635a, second port 635b, and third port 635c. First port 635a and 635b have the same diameter, while port 635c has a reduced diameter compared to 635a or 635b. Connecting second pipe 615 to third pipe 621 is an elbow 641. Connecting third pipe 621 to forth pipe 625 is a reducer 645. A plumber or user can visually look at system 601 and verify that the proper sized fittings were used. What allows a user to visually look at system 601 and be able to verify the proper sized fittings in relation to pipes were used are the color codes on the pipes and fittings.

First mark 651, a circular shape, is located a set distance from the end of the first pipe 611 such that the first mark 651 remains visible while coupled to the adjacent reducing tee 635. Second mark 655, a circular shape, is located a set distance away from the end of reducing tee 635. Because first pipe 611 and the reducing tee 635 are properly sized to couple together first mark 651 is identical in color and pattern to second mark 655. The applicant used similar hatching in first mark 651 and second mark 655 to indicate that the color is the same. The hatching does not indicate a difference in materials just a change in color.

Third mark 659, a diamond shape, is located a set distance from the end of the fifth pipe 631 such that the third mark 659 remains visible while coupled to the adjacent reducing tee 635. Forth mark 661, a diamond shape, is located a set distance away from the end of reducing tee 635. Because fifth pipe 631 and the reducing tee 635 are properly sized to couple together third mark 659 is identical in color to forth mark 661. The applicant used similar hatching in third mark 659 and forth mark 661 to indicate that the color is the same. The hatching does not indicate a difference in materials just a change in color. It should be apparent that the color and shape of first mark 651 is different than forth mark 661 to indicate the difference in diameter between the coupling and the pipe. It should be apparent that the difference between system 201 and system 601 is that system 601 includes the addition of different shapes to aid is designating differences in PVC in addition to using different colors.

Figure 7:
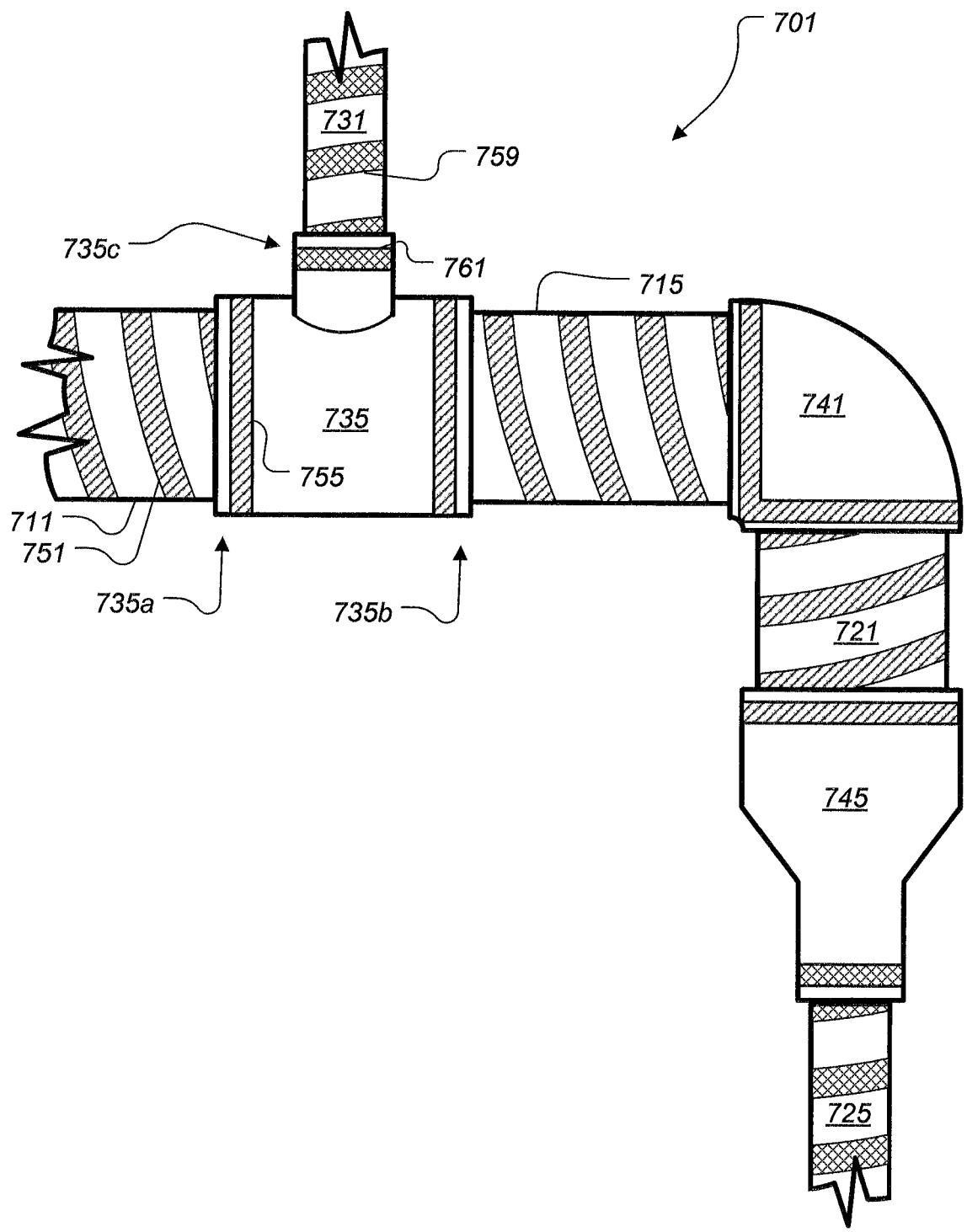
FIG. 7 is a plan view of an embodiment of a color coding system for PVC pipes and couplings according to the present application.

Referring now also to FIG. 7 in the drawings, a preferred embodiment of a color coding system for PVC pipes and couplings according to the present application is illustrated. Plumbing system 701 is a depiction of an improved installation of PVC pipes and PVC fittings. Plumbing system 701 includes a first pipe 711, a second pipe 715, a third pipe 721, a forth pipe 725, and a fifth pipe 731. Connecting first pipe 711 to second pipe 715 is a reducing tee 735 also coupled to fifth pipe 731. Reducing tee 735 has three ports: first port 735a, second port 735b, and third port 735c. First port 735a and 735b have the same diameter, while port 735c has a reduced diameter compared to 735a or 735b. Connecting second pipe 715 to third pipe 721 is an elbow 741. Connecting third pipe 721 to forth pipe 725 is a reducer 745. A plumber or user can visually look at system 701 and verify that the proper sized fittings were used. What allows a user to visually look at system 701 and be able to verify the proper sized fittings in relation to pipes were used are the color codes on the pipes and fittings.

First mark 751 is located on the first pipe 711 such that the first mark 751 remains visible while coupled to the adjacent reducing tee 735 and is candy striped in a curved or helical pattern down the length of the pipe. Second mark 755, a ring around the first port 735a, is located a set distance away from the end of reducing tee 735. Because first pipe 711 and the reducing tee 735 are properly sized to couple together first mark 751 is identical in color to second mark 755. The applicant used similar hatching in first mark 751 and second mark 755 to indicate that the color is the same. The hatching does not indicate a difference in materials just a change in color.

Third mark 759 is located on the fifth pipe 731 such that the third mark 759 remains visible while coupled to the adjacent reducing tee 735 and is candy striped in a curved or helical pattern down the length of the pipe. Forth mark 761, a ring around the third port 735c, is located a set distance away from the end of reducing tee 735. Because fifth pipe 731 and the reducing tee 735 are properly sized to couple together, third mark 759 is identical in color to forth mark 761. The applicant used similar hatching in third mark 759 and forth mark 761 to indicate that the color is the same. The hatching does not indicate a difference in materials just a change in color. It should be apparent that the color of first mark 751 is different than forth mark 761 to indicate the difference in diameter between the coupling and the pipe. It should be apparent that the difference between system 201 and system 701 is that system 701 includes a ring shaped marks around the diameter of the fittings and the spiral stripe down the length of the pipes. Using ring shaped marks and striping the pipes facilitates easy recognition of the fittings and pipes without regards to the relative position of the marks to the user.

Figure 8:
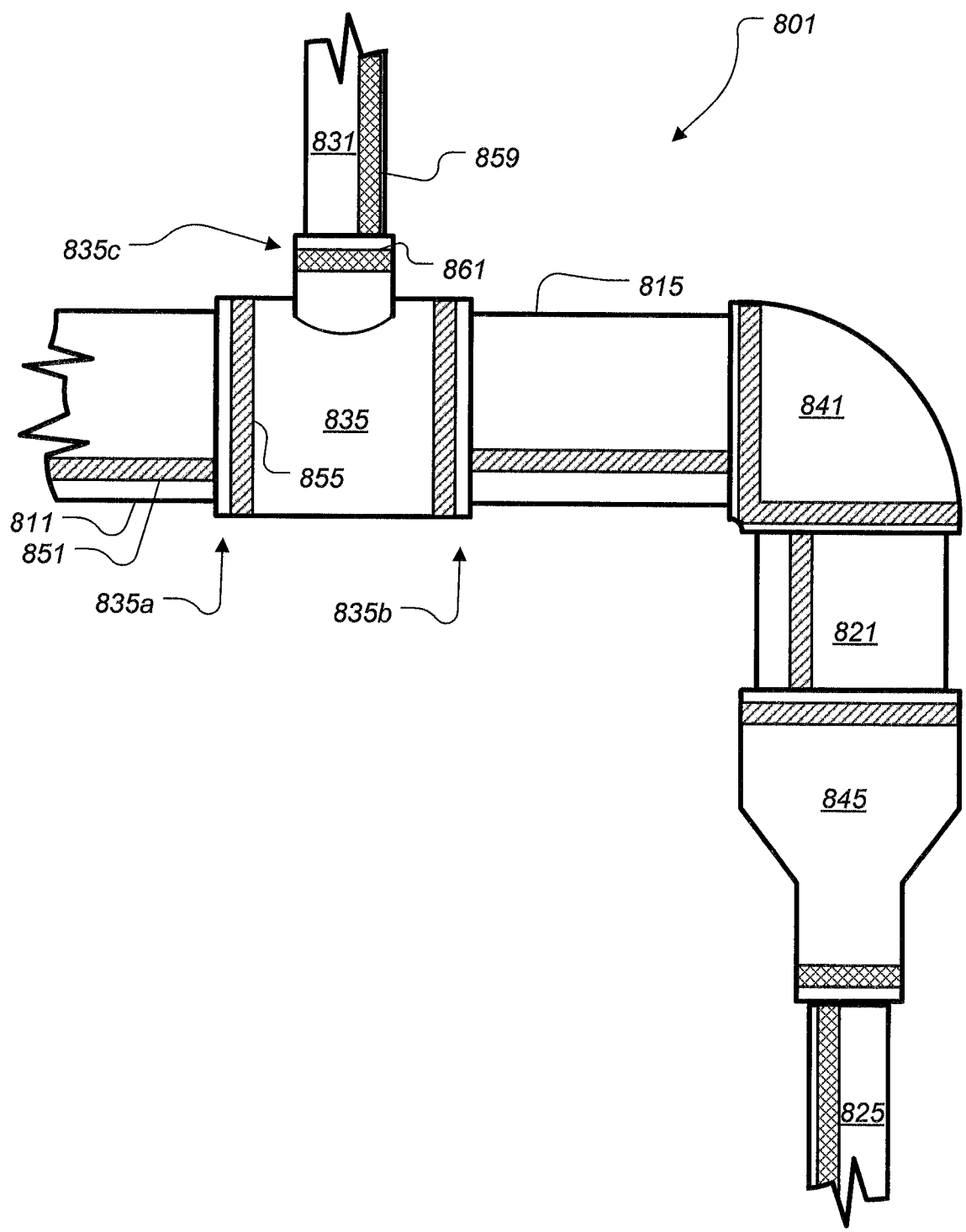
FIG. 8 is a plan view of an embodiment of a color coding system for PVC pipes and couplings according to the present application.

Referring now also to FIG. 8 in the drawings, an alternative embodiment of a color coding system for PVC pipes and couplings according to the present application is illustrated. Plumbing system 801 is a depiction of an improved installation of PVC pipes and PVC fittings. Plumbing system 801 includes a first pipe 811, a second pipe 815, a third pipe 821, a forth pipe 825, and a fifth pipe 831. Connecting first pipe 811 to second pipe 815 is a reducing tee 835 also coupled to fifth pipe 831. Reducing tee 835 has three ports: first port 835a, second port 835b, and third port 835c. First port 835a and 835b have the same diameter, while port 835c has a reduced diameter compared to 835a or 835b. Connecting second pipe 815 to third pipe 821 is an elbow 841. Connecting third pipe 821 to forth pipe 825 is a reducer 845. A plumber or user can visually look at system 801 and verify that the proper sized fittings were used. What allows a user to visually look at system 801 and be able to verify the proper sized fittings in relation to pipes were used are the color codes on the pipes and fittings.

First mark 851 is located on the first pipe 811 such that the first mark 851 remains visible while coupled to the adjacent reducing tee 835 and is striped down the length of the pipe. While first mark 851 is shown as continuous, it should be apparent that first mark 851 could be non-continuous so long as a portion remains readily visible. Second mark 855, a ring around the first port 835a, is located a set distance away from the end of reducing tee 835. Because first pipe 811 and the reducing tee 835 are properly sized to couple together first mark 851 is identical in color to second mark 855. The applicant used similar hatching in first mark 851 and second mark 855 to indicate that the color is the same. The hatching does not indicate a difference in materials just a change in color.

Third mark 859 is located on the fifth pipe 831 such that the third mark 859 remains visible while coupled to the adjacent reducing tee 835 and is striped down the length of the pipe. Forth mark 861, a ring around the third port 835c, is located a set distance away from the end of reducing tee 835. Because fifth pipe 831 and the reducing tee 835 are properly sized to couple together, third mark 859 is identical in color to forth mark 861. The applicant used similar hatching in third mark 859 and forth mark 861 to indicate that the color is the same. The hatching does not indicate a difference in materials just a change in color. It should be apparent that the color of first mark 851 is different than forth mark 861 to indicate the difference in diameter between the coupling and the pipe. It should be apparent that the difference between system 201 and system 801 is that system 801 includes a ring shaped marks around the diameter of the fittings and the linear stripe down the length of the pipes. Using ring shaped marks and striping the pipes facilitates easy recognition of the fittings and pipes without regards to the relative position of the marks to the user.

Figure 9:
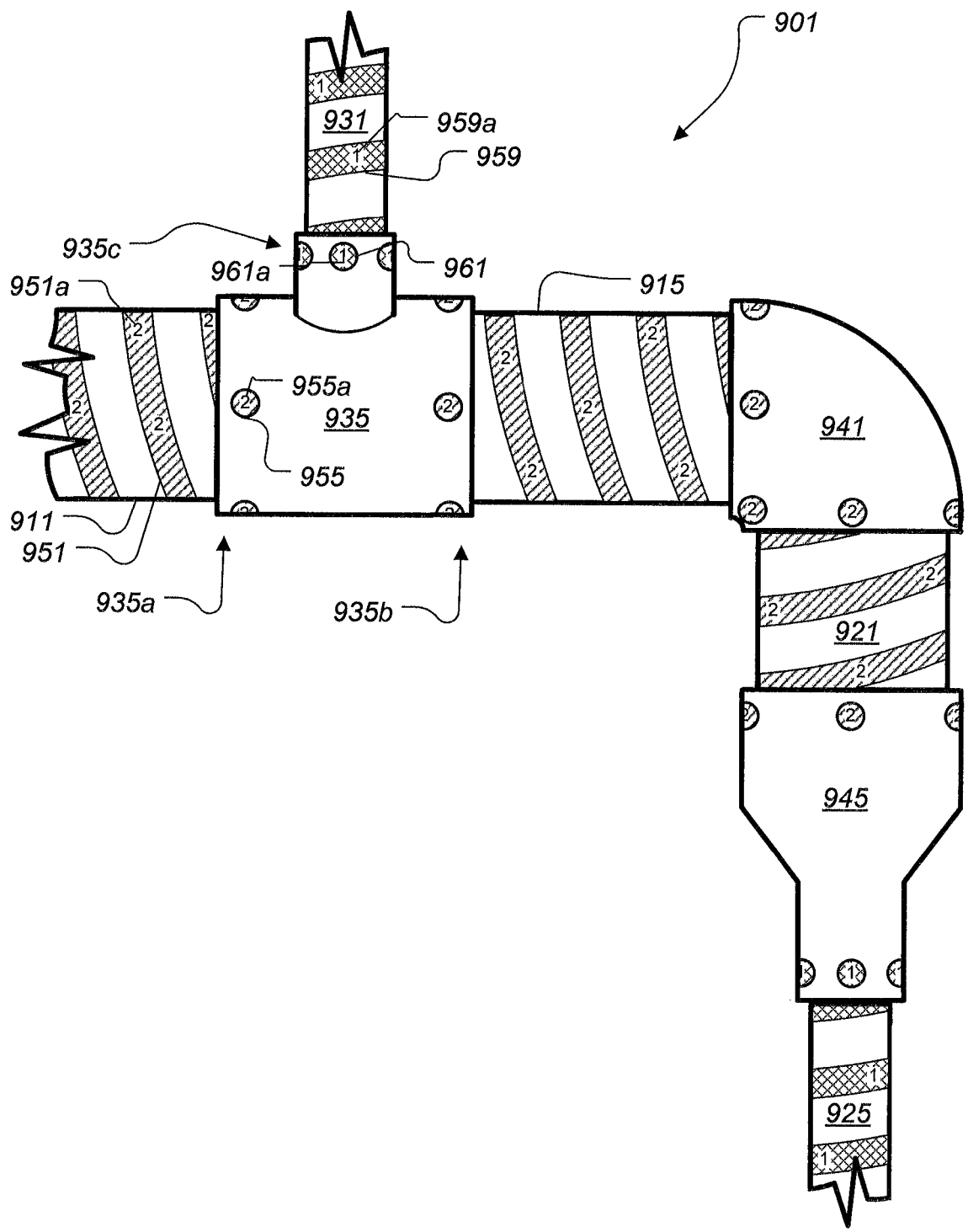
FIG. 9 is a plan view of an embodiment of a color coding system for PVC pipes and couplings according to the present application.

Referring now also to FIG. 9 in the drawings, a preferred embodiment of a color coding system for PVC pipes and couplings according to the present application is illustrated. Plumbing system 901 is a depiction of an improved installation of PVC pipes and PVC fittings. Plumbing system 901 includes a first pipe 911, a second pipe 915, a third pipe 921, a forth pipe 925, and a fifth pipe 931. Connecting first pipe 911 to second pipe 915 is a reducing tee 935 also coupled to fifth pipe 931. Reducing tee 935 has three ports: first port 935a, second port 935b, and third port 935c. First port 935a and 935b have the same diameter, while port 935c has a reduced diameter compared to 935a or 935b. Connecting second pipe 915 to third pipe 921 is an elbow 941. Connecting third pipe 921 to forth pipe 925 is a reducer 945. A plumber or user can visually look at system 901 and verify that the proper sized fittings were used. What allows a user to visually look at system 901 and be able to verify the proper sized fittings in relation to pipes were used are the color codes on the pipes and fittings.

First mark 951 is located on the first pipe 911 such that the first mark 951 remains visible while coupled to the adjacent reducing tee 935 and is candy striped in a curved or helical pattern down the length of the pipe. First mark 951 includes a first indicia 951a located inside the first mark 951. As shown first indicia 951a is the numeral two however other indicia such as other numbers, letters and words are contemplated by this application. Second mark 955 is located a set distance away from the end of reducing tee 935. Second mark 955 includes a second indicia 955a located inside the second mark 955. As shown second indicia 955a is the numeral one however other indicia such as other numbers, letters and words are contemplated by this application. Because first pipe 911 and the reducing tee 935 are properly sized to couple together first mark 951 is identical in color to second mark 955. The applicant used similar hatching in first mark 951 and second mark 955 to indicate that the color is the same. The hatching does not indicate a difference in materials just a change in color.

Third mark 959 is located on the fifth pipe 931 such that the third mark 959 remains visible while coupled to the adjacent reducing tee 935 and is candy striped in a curved or helical pattern down the length of the pipe. Third mark 959 includes a third indicia 959a located inside the third mark 959. As shown second indicia 955a is the numeral one however other indicia such as other numbers, letters and words are contemplated by this application. Forth mark 961 is located a set distance away from the end of reducing tee 935. Forth mark 961 includes a forth indicia 961a located inside the forth mark 961. As shown forth indicia 961a is the numeral two however other indicia such as other numbers, letters and words are contemplated by this application. Because fifth pipe 931 and the reducing tee 935 are properly sized to couple together, third mark 959 is identical in color to forth mark 961 and includes matching indicia 961a and 959a. The applicant used similar hatching in third mark 959 and forth mark 961 to indicate that the color is the same. The hatching does not indicate a difference in materials just a change in color. It should be apparent that the color and indicia of first mark 951 is different than forth mark 961 to indicate the difference in diameter between the coupling and the pipe. It should be apparent that the difference between system 201 and system 901 is that system 901 includes a plurality of marks arrayed around the diameter of the fittings, the spiral stripe down the length of the pipes, and the indicia located inside the marks. Arraying the marks and striping the pipes facilitates easy recognition of the fittings and pipes without regards to the relative position of the marks to the user. Preferably the indicia are molded into the plumbing fixtures, however the indicia could be stamped, painted, stickers, textured, and or not painted.

Figure 10:
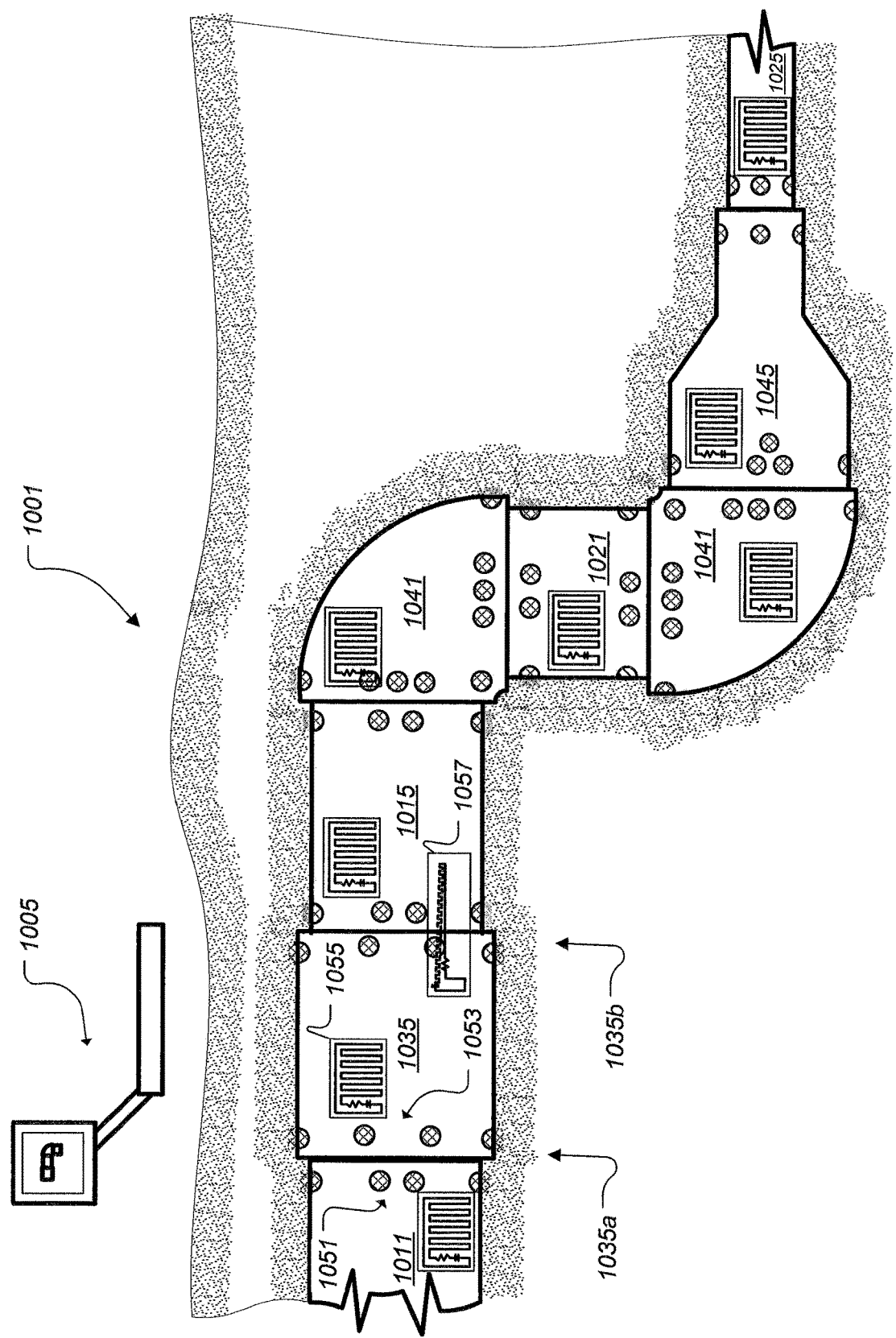
FIG. 10 is a plan view of an embodiment of a color coding system for PVC pipes and couplings according to the present application.

Because the plumbing articles are preferably PVC and will be hidden during installation an improved system to provide installer with a color coded or visual system during installation and a non-visual system after installation is needed. Referring now also to FIG. 10 in the drawings, an embodiment of a color coding system for PVC pipes and couplings according to the present application is illustrated. Plumbing system 1001 is a depiction of an improved installation of PVC pipes and PVC fittings having a variety of devices for determining the configuration of the plumbing system underground without visual access and from a distance. Plumbing system 1001 includes a first pipe 1011, a second pipe 1015, a third pipe 1021, a forth pipe 1025, and a fifth pipe 1031. Connecting first pipe 1011 to second pipe 1015 is a reducing tee 1035 also coupled to fifth pipe 1031. Reducing tee 1035 has three ports: first port 1035a, second port 1035b, and third port 1035c. First port 1035a and 1035b have the same diameter, while port 1035c has a reduced diameter compared to 1035a or 1035b. Connecting second pipe 1015 to third pipe 1021 is an elbow 1041. Connecting third pipe 1021 to forth pipe 1025 is a reducer 1045. A plumber or user can visually look at system 1001 and verify that the proper sized fittings were used. What allows a user to visually look at system 1001 and be able to verify the proper sized fittings in relation to pipes were used are the color codes on the pipes and fittings. Once the system 1001 is covered up and not visible a user can utilize a hand held detector 1005 to determine the configuration of the system 1001 without removing any dirt and rock over the system. Detector 1005 has a display and an emitter to activate the non-visible tags and an antenna to pick up the signals from the non-visible tags. The display of the detector can be configured to display various configurations. For example the detector may have a database of tags signals correlated to various plumbing articles and then display the plumbing article as the detector is moved along the installed plumbing article.

First mark pair 1051 is located a set distance from the end of the first pipe 1011 such that the first mark 1051 remains visible while coupled to the adjacent reducing tee 1035. Second mark pair 1053 is located a set distance away from the end of reducing tee 1035. Because first pipe 1011 and the reducing tee 1035 are properly sized to couple together first mark pair 1051 is identical in color to second mark pair 1053. However, the distance between the pair of marks are selectively different between the first pair 1051 and the second pair 1053 based upon a characteristic of the plumbing article, such as diameter, thickness, material, age, color, and other pertinent data related to the plumbing article. Since the material of the mark is magnetically reflective and/or ferrous the detector can determine the size of plumbing article by measuring the distance between the pair of marks. Furthermore, the pattern of magnetic marks can be utilized by the detector to determine the plumbing article. For example reducer 1045 utilizes three magnetic marks in the shape of a triangle to indicate size change of the plumbing article. The applicant used similar hatching in first mark 1051 and second mark 1053 to indicate that the color is the same. Furthermore, the shape of magnetic marks can be utilized by the detector to determine the plumbing article as the user could see a square versus a diamond shaped mark on the detector and identify the plumbing article. Additionally, the marks may have a varied density of reflective material such that some marks are more magnetically reflective to indicate different diameters or materials of the plumbing article.

Additional underground markers such as mark 1055 and 1057 can be utilized to allow inspection of plumbing articles still in the ground and covered up. Passive mark 1055 is a radio frequency identification tag "RFID" attached to the plumbing article that is remotely energized and weatherproof suitable for being buried. Mark 1055 provides each plumbing article with a unique identification such that the inspector or user can walk along and analysis the plumbing system to determine an inventory of the plumbing articles in the ground without digging them out. Each plumbing article or each type of plumbing article would have a unique tag. Mark 1057 spans across at least two plumbing articles and facilitates situations where the plumbing article does not require multiple marks for example a prebuilt set of valves. While marks 1055 and mark 1057 are shown enlarged it should be apparent that they actually relatively small as compared to the plumbing article. Furthermore, multiple marks 1055 can be incorporated into a tape to repeatedly identify a longer article such a pipe. System 1001 is comprised of a variety of plumbing articles having marks for visual identification along with marks that don't require visual identification of the mark while the plumbing article is underground or behind a wall. Utilizing multiple visual and non-visual marks provides redundancy in case a mark is damaged or if soil conditions or wall conditions preclude detection of a certain type of mark. For example, if the system is located in iron rich soil the ferrous marks might not work but the RFID marks would.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A plumbing article with a diameter and an outer surface, comprising:
   a first colored mark located on the outer surface of the plumbing article, comprising:
      a shape selected based upon the diameter of the plumbing article;
      a color selectively based upon the diameter of the plumbing article; and
      a molded indicia located inside the first colored mark selectively chosen based upon the diameter of the plumbing article;
   wherein the first colored mark is integrally incorporated into a material of the plumbing article such that it is inseparable from the material of the plumbing article; and
   wherein the first colored mark matches a second colored mark located on a plumbing coupling that is sized and configured to be coupled to the plumbing article.

2. The plumbing article according to claim 1, further comprising:
   an array of colored marks located on the outer surface;
   wherein the array of colored marks are visible from all sides of the plumbing article.

3. The plumbing article according to claim 1, further comprising:
   at least a second colored mark located proximate to the first colored mark;
   wherein the first colored mark and the at least second colored mark are the same color.

4. The plumbing article according to claim 1, wherein the plumbing article is a pipe; and
   wherein the first colored mark is a stripe along the length of the pipe.

5. The plumbing article according to claim 1, wherein the first colored mark is non-transferable.

6. The plumbing article according to claim 1, wherein the plumbing article is a fitting; and
   wherein the first colored mark is ring shaped around the fitting and is located proximate an end of the fitting.

7. The plumbing article according to claim 1, wherein the first colored mark is configured to be non-removable.

8. The plumbing article according to claim 7, wherein the first colored mark is sealed.

9. A system for color coding pipes and couplings comprising:
   a first coupling comprising:
      an end;
      a first inner diameter; and
      a first colored mark located proximate the end of the first coupling;
      wherein the first colored mark is selected based upon the first inner diameter of the first coupling and integrally incorporated into a material of the first coupling such that it is inseparable from the material of the first coupling; and
   a second coupling comprising:
      an end;
      a second inner diameter; and
      a second colored mark located proximate the end of the second coupling;
      wherein the second colored mark is selected based upon the second inner diameter of the second coupling and integrally incorporated into a material of the second coupling such that it is inseparable from the material of the second coupling;
   wherein the first coupling and the second coupling are different couplings;
   wherein the first colored mark and the second colored mark are different colors the same; and
   wherein the first coupling and the second coupling are sized and shaped so as to be coupled together.

10. The system according to claim 9, further comprising:
    a detector;
    a first non-visual mark located on the first coupling; and
    a second non-visual mark located on the second coupling;
    wherein the detector can determine between the first coupling and the second coupling by analyzing the first non-visual mark and the second non-visual mark.

11. The system according to claim 9, the first coupling further comprising:
    a plurality of colored marks located proximate the end of the first coupling and arranged in an array around the end of the first coupling.

12. The system according to claim 11, wherein the plurality of colored marks are arranged into a pattern; and
    wherein the pattern is selected based upon the inner diameter of the first coupling.

13. The system according to claim 9, wherein the first colored mark has a first shape;
    wherein the first shape is selected based upon the inner diameter of the first coupling
    wherein the second colored mark has a second shape;
    wherein the second shape is selected based upon the inner diameter of the second coupling; and
    wherein the first shape is different than the second shape.

14. The system according to claim 9, wherein the first colored mark is a ring around the first coupling.

15. The system according to claim 9, further comprising:
    a first non-visual mark located on the first coupling; and
    a second non-visual mark located on the second coupling;
    wherein the first non-visual mark is a RFID tag.

16. The system according to claim 9, further comprising:
    a first non-visual mark located on the first coupling; and
    a second non-visual mark located on the second coupling;
    wherein the first non-visual mark is ferrous.

17. The system according to claim 9, further comprising:
    a molded indicia located inside the first colored mark;
    wherein the molded indicia is selectively chosen at least on the inner diameter of the first coupling.

18. The system according to claim 9, wherein the first colored mark on the first coupling is permanent.

19. The system according to claim 9, wherein the first colored mark on the first coupling is molded.

20. A plumbing article with a diameter and an outer surface, comprising:
    a first colored mark located on the outer surface of the plumbing article, comprising:
       a shape selected based upon the diameter of the plumbing article;
       a color selectively based upon the diameter of the plumbing article; and
       an indicia located inside the first colored mark selectively chosen based upon the diameter of the plumbing article;

wherein the plumbing article is treated to permanently and inseparably display the first colored mark;

wherein the first colored mark remains visible on the plumbing article after the plumbing article is permanently coupled to a second plumbing article having a second colored mark that matches the first colored mark;

wherein the first colored mark corresponds in shape, color, and indicia to the second plumbing article amongst a plurality of other connected plumbing articles; and wherein the plurality of other connected plumbing articles, and in particular, the first plumbing article and the second plumbing article are visually perceptible from a single point of view.

* * * * *